United States Patent [19]

Hurt, Jr.

[11] 4,031,636

[45] June 28, 1977

[54] CARD GRADING SYSTEM

[76] Inventor: John M. Hurt, Jr., P.O. Box 126, Smyrna, Tenn. 37167

[22] Filed: Nov. 28, 1975

[21] Appl. No.: 635,864

[52] U.S. Cl. .............................................. 35/48 A
[51] Int. Cl.² .......................................... G09B 3/08
[58] Field of Search ...................... 35/48 A; 40/78

[56] References Cited

UNITED STATES PATENTS

| 2,137,447 | 11/1938 | Ellis | 35/48 A |
| 2,471,223 | 5/1949 | Lorber | 35/48 A |
| 3,251,141 | 5/1966 | MacRae | 35/9 H |
| 3,780,460 | 12/1973 | Hurt | 40/78 |

Primary Examiner—William H. Grieb
Attorney, Agent, or Firm—Abe Hatcher

[57] ABSTRACT

Grading true-false and multiple-choice foldable answer cards by compacting them and using a key card in front of a pack of the cards as a guide.

9 Claims, 3 Drawing Figures

CARD GRADING SYSTEM

BACKGROUND OF THE INVENTION

1. Field of the Invention

This invention relates to student answer cards to examination questions.

2. Description of the Prior Art

In U.S. Pat. No. 3,780,460 I have described a filing system comprising index cards arranged compactly, for example, in a file box, and containing color-coded columns whereby all cards containing information on a particular listed subject could be instantly located and pulled by color-code recognition.

SUMMARY OF THE INVENTION

I have now found that, buy making certain changes in the cards, I can use them as student answer cards which can be graded in very short order. The term cards as used herein includes printable material of any appropriate substance including paper, plastic and the like of any suitable thickness. What I do according to my invention is to provide along the length of each card spaces for use in answering true-false and/or multiple choice questions which appear either on the card or separately by marking or filling in between lines. My cards also permit inclusion of the name and identification of the student to use the card, and the subject and date, if desired. Blanks or marked spaces may also be used either with directions on how to use already printed or to be added by instructor or student. Grade, period and the like may also appear on the cards. Each card is adapted to be folded once, twice or more times lengthwise along the spaces between lines which are to be filled in, peferably along about the middle of the blank spaces, where the students select what they believe to be the correct answers to any type of test of the true-false, multiple-choice, mark or fill in between-the-lines variety an instructor desires to give. When the cards are properly folded after the students have taken a test, according to my invention all the teacher need do is fold them lengthwise along the answer spaces, put them all together in a stack or in a file box of a size sufficient to hold them close together in compacted form, for example, by putting a rubber band around them, and mark with a pen, pencil, crayon or other-type marker of a color different from that used by the students for marking their answers, either all the way across the stack in each of the columns of spaces in which the correct answers should appear, or by marking only the ones left blank where the students using a card marks a wrong answer. Also, he can simply observe the blank spaces for the correct answers where the students have marked the wrong choices if he so desires. Thus, the answer cards for a whole class can be graded more quickly even than by use of a computer, in fact, in less than a minute or two for a class of around 25 students, since all the wrong answers will appear in red, or whatever the color of the marking instrument was, on the folded edge when a key card with correct answers marked thereon is used as a top or cover card. For cards folded once, there may be, for example, 25 questions along a fold so that, when the cards are printed on the back also, there can be 50 questions per card. If more than 50 questions appear on an examination two cards per pupil may be used. On cards folded twice there can be, for example, 25 questions along a fold so that on cards printed on the back there can be 100 answers.

BRIEF DESCRIPTION OF THE DRAWING

For a better understanding of my invention reference will now be made to the drawing which forms a part hereof.

In the drawing,

Figure 1:
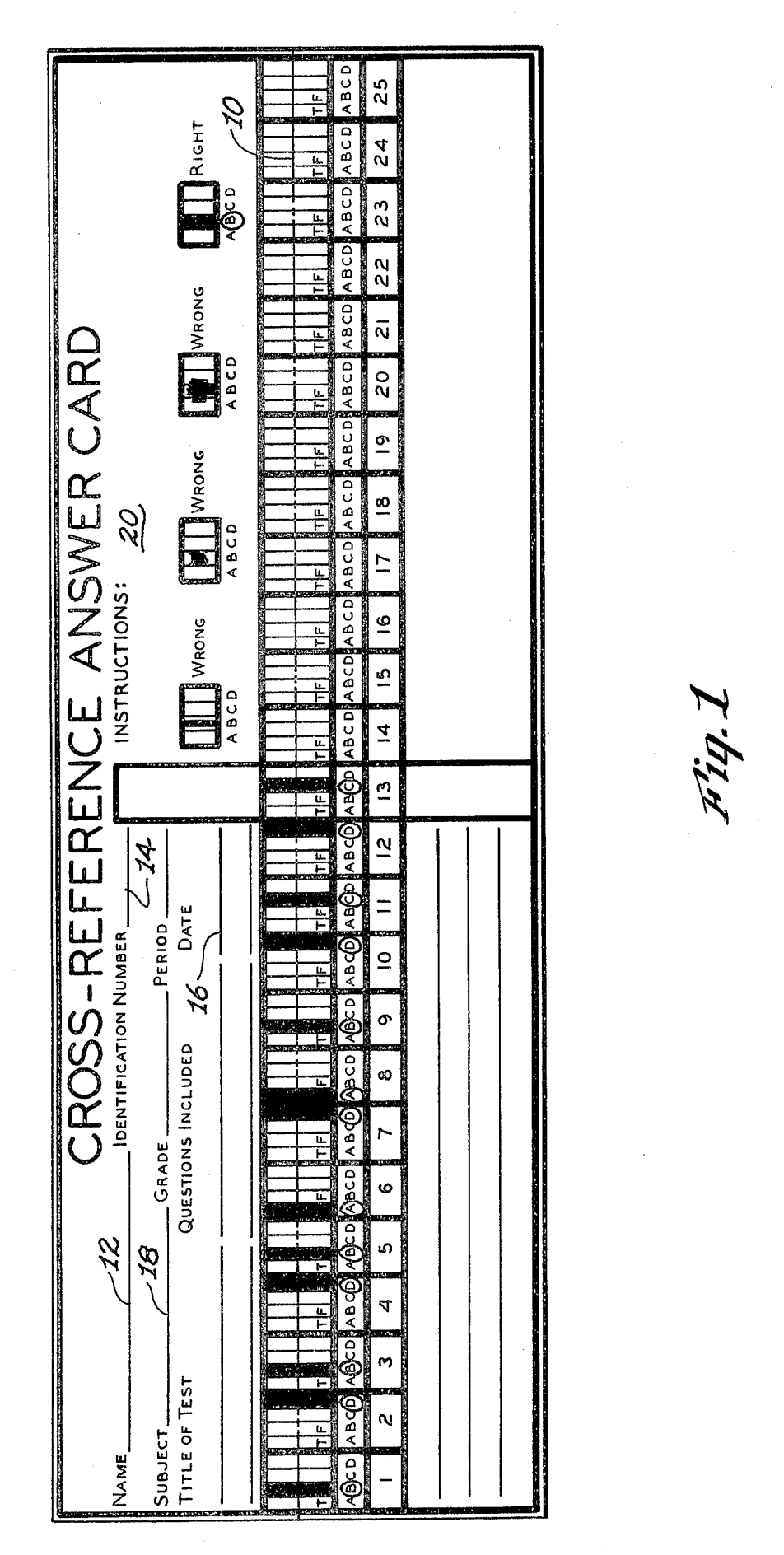

FIG. 1 shows one side of a representative card which may be folded along the center length according to the invention.

FIG. 2 depicts one side of a representative card of the invention foldable lengthwise along two horizontal columns of true-false, multiple-choice answer portions.

In FIG. 3 is shown a perspective view, looking down somewhat from above, of a plurality of cards according to the invention held close together showing how the incorrect answers can be easily found by observing the blank spaces (white) behind and in line with the front key card which has the correct answers filled in in black.

In the drawing places where the cards are to be folded are shown at 10 and spaces for student's name, identification number date, subject and instructions at 12, 14, 16, 18 and 20 respectively.

The cards shown in the drawing do not contain questions, however, questions can appear on the drawing if desired.

DESCRIPTION OF THE PREFERRED EMBODIMENT

The following example is illustrative of my invention.

Figures 2, 3:
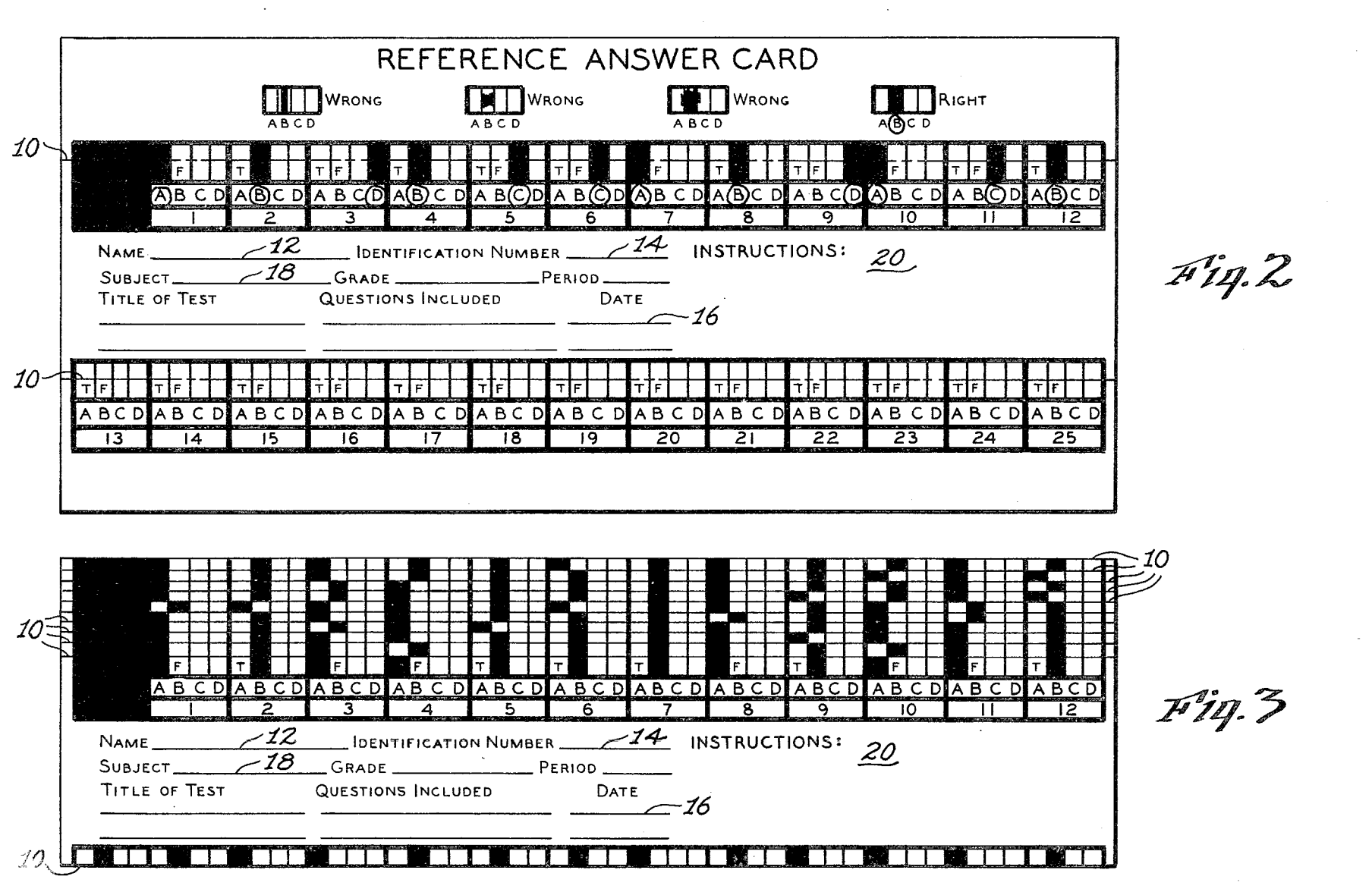

An instructor took answer cards such as those of FIG. 2 having two rows of multiple-choice, true-false answers to 12 each (total 24) of a class of about 20 students, folded them along the two rows such that the marked black ink or pencil answers showed on the folded edges, compacted them, put a rubber band around them and then, using a front card as a key, pulled a red marker along the correct answers so that where the correct answer was not marked the blank space showed up as red and easy to see. He then unfolded the cards and entered the number wrong on each card, also giving each student a percentage grade, all within about 3–4 minutes for grading the whole class.

One advantage of my invention is that an instructor can quickly count the incorrect answers to any desired question by observing the spaces left blank in the column which should have been marked if the correct answer had been known. This allows the instructor to re-teach only those items which are generally not understood by the class as a whole. A further advantage is that cards, especially those folded only once or having only one fold, can have the number wrong or grade total marked right on them in an instant, even without removing them from the file drawer or stack of cards held together with an elastic band. As already stated, all the instructor need do is note white or blank spaces in the columns behind the correct answers on a key, or, if he uses a red or other color marker, note the spaces marked in red or other color different from that of the students' pencils or pens.

While the invention has been described in terms of preferred embodiments, the claims appended hereto are intended to encompass all embodiments which fall within the spirit of the invention.

Having thus described my invention and certain preferred embodiments thereof, I claim:

1. An answer card bearing at least one lengthwise column of true-false/multiple-choice answer spaces having lines thereon for marking between to indicate answers to a plurality of questions, said card being adapted to be folded along the length of said answer spaces so as to present, when viewed from above, a top rim edge which will offer a visible mark thereon when folded and compacted together in a stack with a plurality of said cards after said lines have been marked between and a key card at least one end of the stack with lines marked between to indicate correct answers.

2. The card of claim 1 wherein said plurality of questions do not appear on said card.

3. The card of claim 1 bearing additionally spaces for a student's identification.

4. The card of claim 1 wherein said plurality of questions appears on said card.

5. The card of claim 1 bearing two lengthwise columns.

6. The card of claim 1 in a stack of like cards, said cards being folded along the length of said answer spaces having said lines marked between to indicate answers.

7. A method for grading examinations which comprises, without using guide means, compacting in a stack a plurality of answer cards bearing thereon at least one lengthwise column of true/false multiple choice answer spaces having lines marked between to indicate answers, folding said cards along the length of said at least one column of answer spaces, so as to present, when viewed from above, a top rim edge which will offer a visible mark thereon placing a key having lines marked between to indicate correct answers as a front card in said stack and, without using holders, grading each card based upon the number of incorrect answers marked.

8. The method of claim 7 wherein the grading comprises marking to show an incorrect answer at each correct answer space not already marked.

9. The method of claim 7 wherein the grading comprises pulling a marker of a different color from that appearing on the lines marked between across the folded edges of the compacted stacked cards in line with the correct answers marked on the key, thereby making the incorrect answers stand out.

* * * * *